United States Patent

Suganuma et al.

[11] Patent Number: 5,325,450
[45] Date of Patent: Jun. 28, 1994

[54] OPTICAL FIBER COUPLER AND ITS MANUFACTURING METHOD

[75] Inventors: Hiroshi Suganuma; Eisuke Sasaoka; Tomoyuki Hattori; Hiroaki Takimoto; Hiroshi Yokota, all of Kanagawa, Japan

[73] Assignee: Sumitomo Electric Industries, Ltd., Osaka, Japan

[21] Appl. No.: 25,643

[22] Filed: Mar. 3, 1993

[30] Foreign Application Priority Data

Mar. 4, 1992 [JP] Japan .................. 4-082743

[51] Int. Cl.$^5$ .................. G02B 6/26; H04J 14/00; C03B 23/20
[52] U.S. Cl. .................. 385/39; 385/42; 385/43; 385/50; 385/51; 359/127; 65/4.1; 65/4.2
[58] Field of Search .................. 385/39, 42, 43, 44, 385/46, 51, 50, 30; 65/3.11, 4.1, 4.2; 359/114, 123, 124, 127

[56] References Cited

U.S. PATENT DOCUMENTS

| | | | |
|---|---|---|---|
| 4,336,047 | 6/1982 | Pavlopoulos et al. | 65/3.31 |
| 4,593,968 | 6/1986 | Giallorenzi | 385/39 X |
| 4,726,643 | 2/1988 | Imoto et al. | 385/43 X |
| 4,772,085 | 9/1988 | Moore et al. | 385/43 X |
| 4,796,968 | 1/1989 | Coccoli et al. | 385/43 X |
| 4,822,128 | 4/1989 | Imoto et al. | 385/43 X |
| 4,842,359 | 6/1989 | Imoto et al. | 385/43 X |
| 5,004,316 | 4/1991 | Hill et al. | 385/43 X |
| 5,121,453 | 6/1992 | Orazi et al. | 385/43 X |
| 5,136,669 | 8/1992 | Gerdt | 385/39 |
| 5,148,508 | 9/1992 | Anjan et al. | 385/42 X |
| 5,171,345 | 12/1992 | Takemura | 385/43 X |
| 5,208,883 | 5/1993 | Hattori et al. | 385/43 |

FOREIGN PATENT DOCUMENTS

| | | | |
|---|---|---|---|
| 0366110 | 5/1990 | European Pat. Off. | 385/39 X |
| 2242207 | 9/1990 | Japan | 385/39 X |

OTHER PUBLICATIONS

N. Kawakami; "Optical Fiber Coupler", New Glass, vol. 6, No. 1, 1991, pp. 48–59.
Chen, "Effect of Twist on Fused Couplers", Applied Optics, vol. 27, No. 23, Dec. 1, 1988, pp. 4802–4806.
Birks, "Practical Tuning Mechanism for Fused-Tapered Couplers", Optics Letters, vol. 13, No. 12, Dec. 1988, pp. 1126–1128.
"Wavelength Combining Fused-Taper Couplers With Low Sensitivity to Polarisation for Use With 1480 nm—Pumped Erbium-Doped Fibre Amplifiers", Electronics Letters, Apr. 12, 1990, vol. 26, No. 8.

*Primary Examiner*—Brian Healy
*Attorney, Agent, or Firm*—Cushman, Darby & Cushman

[57] ABSTRACT

An optical fiber coupler having a crosstalk characteristic of at least 18 dB. The optical fiber coupler includes a plurality of optical fibers. A length of glass in the optical fibers is exposed by removing the covering. The glass lengths are fused together and extended, during which time the fibers are twisted and subjected to a tension. The twisted fibers are then fixed to a protecting member while the tension is sustained.

6 Claims, 3 Drawing Sheets

OPTICAL FIBER COUPLER AND ITS MANUFACTURING METHOD

BACKGROUND OF THE INVENTION

1. Field of the Invention

The present invention relates to an optical fiber coupler having wavelength multi- and demultiplexing functions.

2. Description of the Art

The optical fiber coupler with wavelength multi- and demultiplexing functions is a device for multiplexing and demultiplexing light waves of different wavelengths traveling through optical fibers.

FIG. 2 is a diagram schematically showing a conventional wavelength multiplexing/demultiplexing optical fiber coupler. In the Figure, reference numerals 1a and 1b designate optical fibers; 2, an optical coupling portion; 3, a protecting member; and 4, an adhesive portion. The method, which is most popular now, to manufacture the multiplexing/demultiplexing optical fiber coupler is a melt-extension method. This method is described in NEW GLASS, Vol. 6, No. 1, 1991, pp. 48 to 59. In this method, the covers of a plurality of optical fibers are partially removed. The uncovered portions or glass portions of the optical fibers are joined and bonded together by heating the exposed glass fibers by burner, for example. The bonded glass portion is extended and further heated to form an optical coupling portion 2. The extending process is continued until a desired characteristic (branch ratio) of the coupler is obtained. The characteristic of the optical fiber is measured during the extending process in such a way that light is input to one end of one of the optical fibers 1a and 1b, and light output from the other ends of the optical fibers is detected. Finally, the extended, bonded-portion of the optical fibers is fixed to a protecting members by adhesion. The optical fiber coupler is thus manufactured and is shown in FIG. 2.

The optical fiber coupler manufactured as stated above has a wavelength demultiplexing function. When a light wave of the wavelength λ1 and another light wave of the wavelength λ2 are simultaneously input at an input port, light of λ1 emanates from an output port 1 and light of λ2 emanates from an output port 2. In the description to follow, intensity of the light incident on the input port is denoted as $P_0$, an intensity output from the output 1 as $P_1$, and an intensity output from the output port 2 as $P_2$.

FIG. 3 is a graph showing the characteristic of the conventional wavelength multiplexing/demultiplexing optical fiber coupler, which was described in connection with FIG. 2. In FIG. 3, a broken line indicates $P_1 - P_0$, and a solid line, $P_2 - P_0$. At a wavelength λ1, the light intensity $P_1$ is large, while the light intensity $P_2$ is small. This fact implies that most of the wavelength λ1 is output from the output port 1, and that most of the light of the wavelength λ2 is output from the output port 2.

A degree of the wavelength demultiplexing capability is called a cross talk. A large cross talk indicates a high wavelength demultiplexing capability. In FIG. 3, the difference between the broken line and the solid line at the wavelength λ1 indicates a magnitude of the cross talk. In the fields of communication and sensors, the cross talk is desirably 15 dB or more.

The conventional optical fiber coupler of this type has a tendency that when the width $\Delta\lambda$ ($=\lambda 2-\lambda 1$) of the wavelengths to be multiplexed is selected to be 100 nm or shorter, the cross talk is small.

SUMMARY OF THE INVENTION

The present invention has an object to provide an optical fiber coupler which can have a good wavelength multiplexing/demultiplexing characteristic even when the difference between the wavelengths of the light waves to be multiplexed or demultiplexed is small.

According to the present invention, there is provided an optical fiber coupler having wavelength multiplexing and demultiplexing functions in which an optical coupling portion formed by fusion bonding and extending a plurality of optical fibers is fixed to a protecting member while being twisted. Furthermore, the invention is directed to a method of manufacturing an optical fiber coupler in which glass portions of a plurality of optical fibers are aligned in parallel, put together, and fusion bonded to each other by heating the glass portions, then the bonded glass portions being heated is extended to form an optical coupling portion, and thereafter the optical coupling portion being twisted is fixed to a protecting member. In the optical fiber coupler manufacturing method, a fixed tension is applied to the optical coupling portion during the twisting of the optical coupling portion, and the optical fibers are fixed to the protecting member in a state so that the tension applied is sustained. In the method, the tension may be applied during twisting in a manner that the tension is increased as the amount of twist increased.

In the optical fiber coupler of the invention, since the optical fiber coupler, while being twisted, is fixed to the protecting member, the cross talk is increased. The shift of the wavelength, caused by the twist, can be corrected by applying a tension to the coupler. Therefore, the optical fiber coupler has a good wavelength multiplexing/demultiplexing characteristic even when the difference between the wavelengths of the light waves to be multiplexed or demultiplexed is small.

Other objects, features and characteristics of the present invention, as well as the methods and functions of the related elements of the structure, and to the combination of parts and economies of manufacture, will become apparent upon consideration of the following description and the appended claims, with reference to the accompanying drawings, all of which form a part of this specification.

BRIEF DESCRIPTION OF THE DRAWINGS

In the drawings, like reference numerals designate corresponding parts in the various Figures. The drawings are.

DETAILED DESCRIPTION OF THE PREFERRED EMBODIMENT

Figure 1:
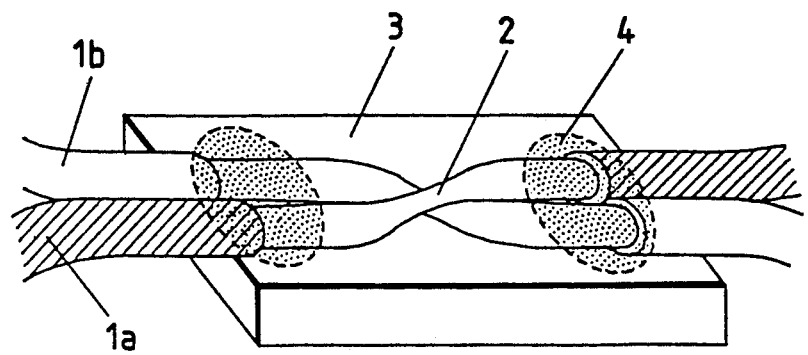
FIG. 1, which schematically shows an optical fiber coupler according to an embodiment of the present invention.
Figure 2:
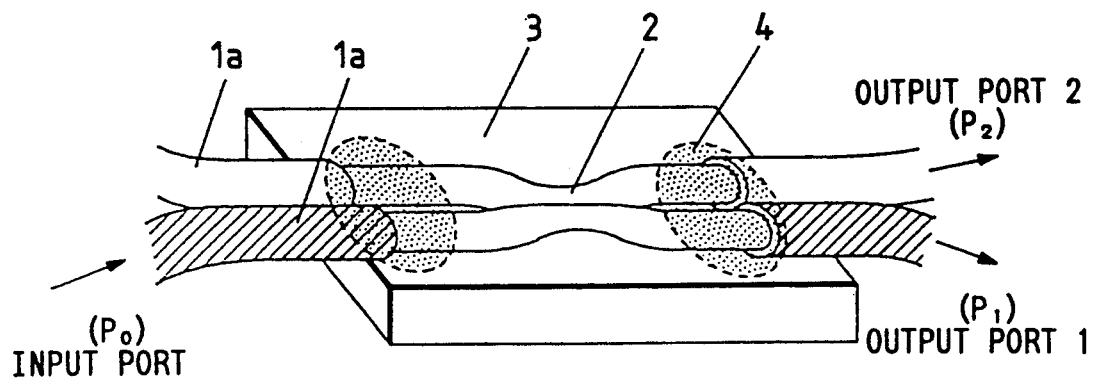
FIG. 2, which schematically shows a conventional wavelength multiplexing/demultiplexing optical fiber coupler.
Figure 3:
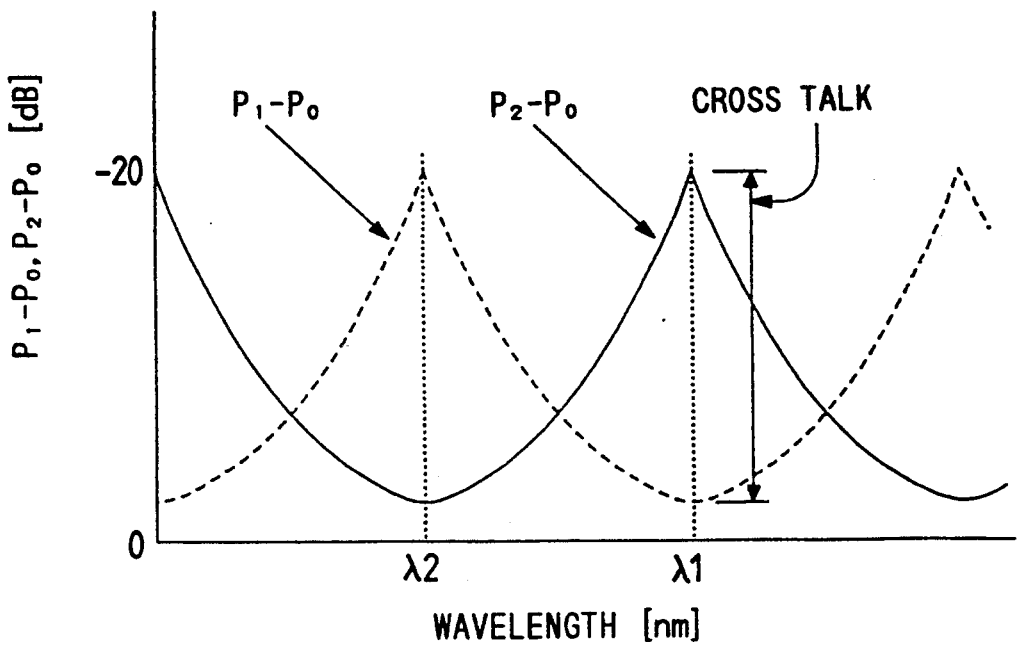
FIG. 3, a graph of the characteristic of the conventional wavelength multiplexing/demultiplexing optical fiber coupler shown in FIG. 2.

FIG. 1 illustrates an optical fiber coupler according to an embodiment of the present invention. In the Figure, like or equivalent portions are designated by like reference numerals as in FIG. 2. An optical coupling portion 2 of optical fibers is twisted 180°. The optical coupling portion 2, while being twisted, is fixed to a protecting member 3 by a proper adhesion at adhesive portions 4.

Figure 5:
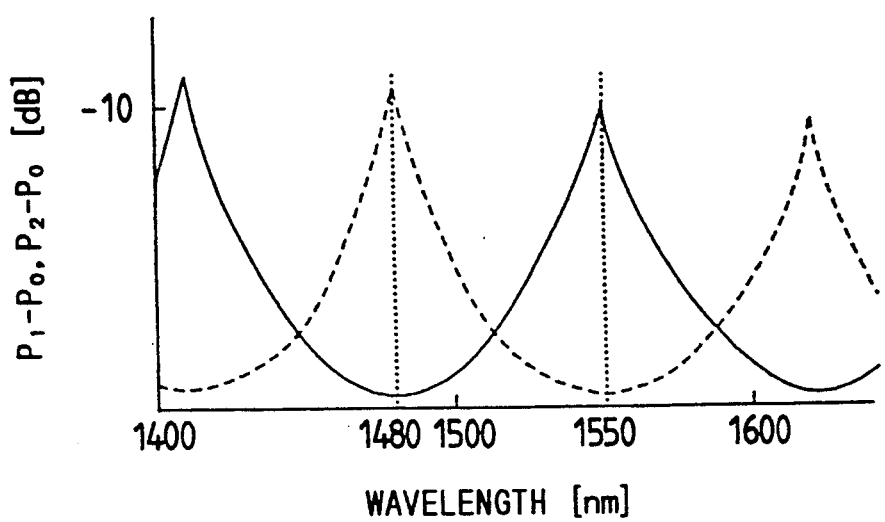
FIG. 5, a graph of the characteristic of a wavelength multiplexing/demultiplexing optical fiber coupler manufactured by a conventional optical fiber manufacturing method.

The reason why the optical coupling portion 2 is twisted will be described with reference to FIGS. 5 and 6. FIG. 5 is a graph showing the characteristic of a wavelength multiplexing/demultiplexing optical fiber coupler manufactured by a conventional optical fiber manufacturing method. The optical fiber coupler used here is of the type of cable for handling light waves of 1.48 $\mu$m and 1.55 $\mu$m in wavelength. In this coupler, the wavelength difference between the two light waves, which are to be multiplexed or demultiplexed, is small. Then, the cross talk is approximately 10 db at 1.55 $\mu$m in wavelength. This Figure for the cross talk indicates a poor cross talk performance.

Figure 6:
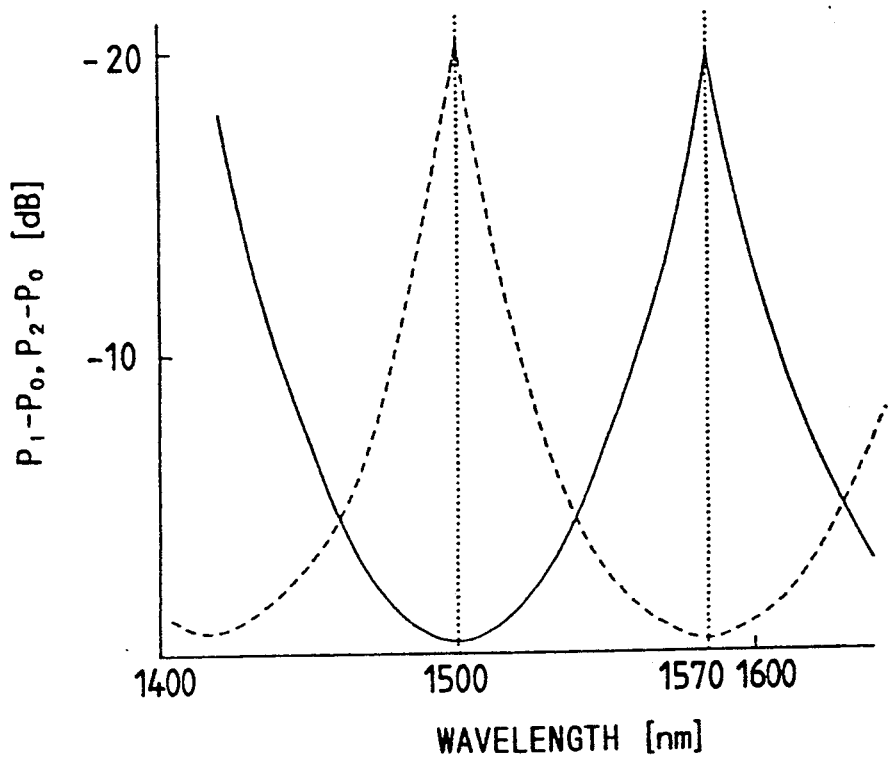
FIG. 6, a graph of the characteristic of a wavelength multiplexing/demultiplexing optical fiber coupler manufactured by an optical fiber coupler manufacturing method according to the present invention.

FIG. 6 is a graph showing the characteristic of a wavelength multiplexing/demultiplexing optical fiber coupler manufactured by an optical fiber manufacturing method according to the present invention. The optical fiber coupler of the invention has the same construction as that of the FIG. 1 coupler, but the optical coupling portion is twisted by 360°. As seen from the graph of FIG. 6, the cross talk is very high, 20 dB or more at the wavelength of approximately 1.55 $\mu$m. This Figure indicates that the cross talk is increased by the twist of the optical coupling portion 2.

FIGS. 5 and 6 further indicate that in addition to the increase of the cross talk, the wavelengths of the multi- and demultiplexing light waves shift from the prescribed ones. The quantity of the wavelength shift is different every time the optical fiber coupler is manufactured. In other words, the performances of the manufactured couplers are not uniform.

A careful study was made regarding the above phenomenon. From the study, it is seen that the phenomenon arises from the intricate cooperative action of the twist and a tension applied to the optical coupling portion. It is further seen that when a fixed tension is applied constantly to the optical coupling portion, the wavelength is shifted very little and the wavelength shift, if presented, can be corrected by applying a tension to the optical coupling portion.

The above facts led to the following method of manufacturing an optical fiber coupler.

1) As in the conventional method, the covers of a plurality of optical fibers are partially removed to expose the glass fibers of the optical fibers. The exposed glass fiber portions are put together, and fusion bonded to each other by heating. The bonded portion is lengthened, by continuous heating, to form an optical coupling portion. In this case, a quantity ($\theta$) of the twist which is required for improving the cross talk, and a quantity ($\lambda s$) of wavelength shift resulting from the twist, are previously determined, in order that the resultant optical fiber coupler has such a characteristic that the multi- and demultiplexing wavelength is shifted by $\lambda s$ from a prescribed one.

2) The thus formed optical coupling portion of the coupler is twisted by a quantity $\theta$ while it is being subjected to a fixed tension. Alternatively to step 2), step 2') may be used.

2') The optical coupling portion of the coupler is slowly twisted while the tension of the optical coupling portion is progressively increased in accordance with the amount of twist so as to compensate for the wavelength shift.

3) The optical coupling portion and the optical fibers are fixed to the protecting member, sustaining the twist and the tension in the optical coupling portion.

The multiplexing/demultiplexing optical fiber coupler, which was manufactured by the method as described above, has an excellent cross talk at a prescribed multiplexing/demultiplexing wavelength.

Figure 4:
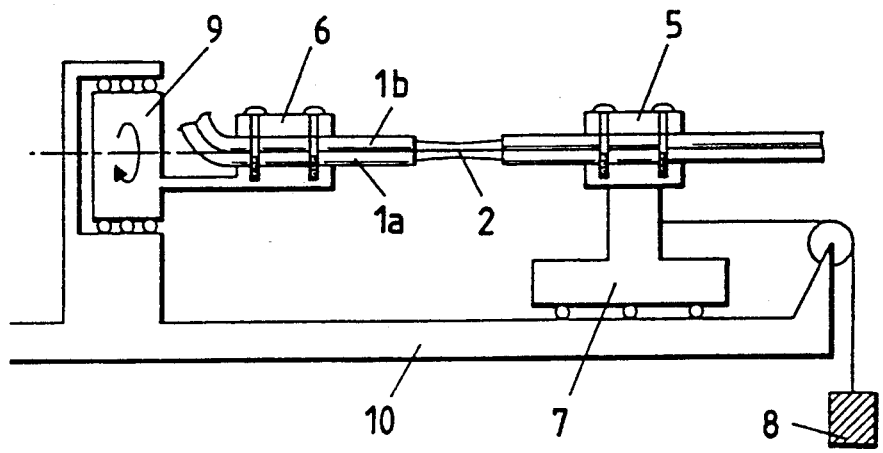
FIG. 4, a diagram depicting a tension/twist applying apparatus used for executing the method of manufacturing a wavelength multiplexing/demultiplexing optical fiber coupler according to the present invention.

FIG. 4 illustrates a tension/twist applying apparatus used for executing the method of manufacturing a multiplexing/demultiplexing optical fiber coupler according to the present invention. In the Figure, reference numeral 1a and 1b are optical fibers, 2 is an optical coupling portion, 5 and 6 are fiber fixing tools, 7 is a slider, 8 is a tension applying means, 9 is a rotary slider, and 10 is a base. The optical fibers 1a and 1b are fixed to the fiber fixing tool 5. The optical coupling portion 2 is heated in the middle thereof, and fusion bonded together and lengthened by a heating means (not shown). The fiber fixing tool 5 is fastened to the slider 7. The slider 7 is slidably mounted on the base 10 in a manner such that it is movable there along. The slider 7 is provided with the tension source, or tension applying means 8. When the tension source 8 is driven, the slider 7 is pulled toward the tension source 8. The tension source 8 may be driven by means such as springs, oil pressure, hydraulic pressure and/or motors. The tension may be fixed at a constant value, or may be varied as desired. The fiber fixing tool 6 is fastened to the rotary slider 9. The rotary slider 9, fixed to the base 10, is rotatable about the longitudinal axis of the optical fibers 1a and 1b fixed to the fixing tool 6. When the rotary slider 9 is turned, the fixing tool 6 and the ends of the optical fibers 1a and 1b are turned in unison.

The operation of the tension/twist applying apparatus will raw be described. To start, the optical fibers 1a and 1b are fixed to the fiber fixing tools 5 and 6. The covers of the optical fibers are partially removed to expose the glass fibers thereof. The exposed glass fibers are aligned in parallel and brought into close contact, and then are heated by a heating means, not shown, to be fusion bonded together. At this time, the tension source 8 is not yet driven. The optical coupling portion 2, while being heated, is extended by operating the tension source 8. After it is extended, the rotary slider 9 is rotated to twist the optical coupling portion 2 by the quantity $\theta$, while the tension source 8 is being operated. The extension and twist of the optical coupling portion results in a change of the length of the optical fibers 1a and 1b. Accordingly, the distance between the fiber fixing tools 5 and 6 also changes. The distance change is absorbed through the movement of the slider 7. Finally, the optical coupling portion 2 and the optical fibers 1a and 1b are bonded to the protecting member (not shown) by adhesion, for example, while the twist and the tension are maintained in the coupling portion.

Examples of the optical fiber coupler manufacturing method will be specifically described.

EXAMPLE 1

In the first example of the optical fiber coupler manufacturing method, the covers of two dispersion shift optical fibers were removed over a range of approximately 25 mm in length. The uncovered portions of glass fibers were aligned parallel to one another and put together. The uncovered portions were then bonded to each other by heating the uncovered portion with flames from propane/oxygen. Tension of 1.5 g was applied to the bonded portion of the optical fibers in a heated state, thereby extending the bonded portion. During the extending process, light was input to one end of one of the two optical fibers, and light output from the other ends of both optical fibers was monitored. When the multiplexing/demultiplexing wavelengths reached 1.45 μm and 1.52 μm, the extending process was stopped. Thereafter, the extended bonded-portion was twisted by 360° while being pulled by force of 1.5 g. To twist and pull the bonded portion, the tension/twist applying apparatus shown in FIG. 4 was used in order to keep a fixed tension throughout the process of twisting the optical fibers. A change in the multiplexing/demultiplexing wavelength caused by the twist of the optical coupling portion was experimentally confirmed by monitoring the coupler characteristic during extension process. In the experiment, the twisting operation was stopped when the optical coupling portion was turned by 360° and the multiplexing-/demultiplexing wavelengths were 1.48 μm and 1.55 μm. Afterward, the optical fibers (including the optical coupling portion) were fixed to the protecting member by adhesion while the twist quantity and the tension in the optical coupling portion were sustained.

In the optical fiber coupler thus manufactured, the cross talk was 18 dB or more at 1.55 μm of wavelength. On the other hand, in the 1.48/1.55 μm optical fiber coupler which was manufactured with no twist process, the cross talk was 11 Db. When those Figures representing the cross talk are compared, it is seen that the cross talk performance of the optical fiber coupler of the present invention is considerably better than the untwisted optical fiber coupler.

EXAMPLE 2

In the second example of the optical fiber coupler manufacturing method, the covers of two single-mode optical fibers were removed over a range of approximately 25 mm in length. The uncovered portions of glass fibers were aligned parallel to one another and put together. The uncovered portions were then bonded to each other by heating them with flame from propane/oxygen. Tension of 1.5 g was applied to the bonded portion of the optical fibers while being heated, thereby extending the bonded portion. During the extending process, light was input to one end of one of the two optical fibers and light output from the other ends of the optical fibers was monitored. When the multiplexing/demultiplexing wavelengths reached 1.48 μm and 1.55 μm, the extending process was stopped. In the optical fiber coupler thus manufactured, the cross talk was 11 dB or more at a wavelength of 1.55 μm wavelength. Thereafter, the optical coupling portion was twisted while monitoring the coupler characteristics, and was stopped when a peak cross talk was gained. A tension was progressively applied to the optical coupling portion (fibers) to compensate for the shift of the multiplexing/demultiplexing wavelengths, which was caused by the twisting operation. The tension/twist applying apparatus shown in FIG. 4 may be used for applying the tension. To gain the peak cross talk of 18 dB, a twist quantity of 360° and a tension of 26 g were required. Afterward, the optical fibers (including the optical coupling portion) were fixed to a protecting member by adhesion while the twist quantity and the tension in the optical portion were sustained.

As seen from the foregoing description, the present invention has succeeded in providing an optical fiber coupler having good characteristics irrespective of the multiplexing/demultiplexing wavelengths, and is well suited for communication and sensors.

While the invention has been described in connection with what is presently considered to be the most practical and preferred embodiment, it is to be understood that the invention is not to be limited to the disclosed embodiment, but is intended to cover various modifications and equivalent arrangements included within the spirit and scope of the appended claims.

What is claimed is:

1. An optical fiber coupler comprising:
   a plurality of optical fibers, each having a length along which a cover thereof is cut away so that a glass fiber is revealed;
   wherein said glass fibers along said length of said plurality of optical fibers are fusion bonded together and extended;
   wherein said glass fibers along said length are twisted;
   wherein said plurality of optical fibers are fixed under a tension to a protecting member at opposite ends of said length; and
   wherein said optical fiber coupler has a crosstalk characteristic of at least 18 dB.

2. A method of manufacturing an optical fiber coupler comprising the steps of:
   aligning uncovered glass portions of a plurality of optical fibers parallel to one another;
   fusion bonding the uncovered glass portions by heating and simultaneously extending the bonded glass portions, thus forming an optical coupling portion;
   twisting and fixing the optical coupling portion to a protecting member; and
   thus producing an optical fiber coupler having a crosstalk characteristic of at least 18 dB.

3. The method of manufacturing an optical fiber coupler according to claim 2, further comprising the steps of:
   applying a fixed tension to the optical coupling portion during the twisting step; and
   sustaining the tension in the optical fibers during the fixing step.

4. The method of manufacturing an optical fiber coupler according to claim 2 further comprising the steps of:
   applying a tension to the optical coupling portion during the twisting step such that said tension is increased as an amount of twist is increased; and
   sustaining the tension in the optical fibers during the fixing step.

5. An apparatus for performing the method of claim 2, said apparatus comprising:
   a base;
   a first fiber fixing member disposed slidably on said base;

a tension source for imparting tension to said first fiber fixing member;

a second fiber fixing member rotatably coupled to said base for imparting a twist to said plurality of optical fibers.

6. An optical fiber coupler formed by the process comprising the steps of:

aligning uncovered glass portions of a plurality of optical fibers parallel to one another;

fusion bonding the uncovered glass portions by heating and simultaneously extending the bonded glass portions, thus forming an optical coupling portion;

twisting and fixing the optical coupling portion to a protecting member; and thereby forming an optical fiber coupler having a crosstalk characteristic of at least 18 dB.

* * * * *